(12) United States Patent
Li et al.

(10) Patent No.: US 10,310,960 B2
(45) Date of Patent: Jun. 4, 2019

(54) DEBUGGING FOR SQL STATEMENT

(71) Applicant: INTERNATIONAL BUSINESS MACHINES CORPORATION, Armonk, NY (US)

(72) Inventors: Shuo Li, Beijing (CN); Xin Peng Liu, Beijing (CN); Xiaobo Wang, Beijing (CN); Xiong Wei Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 15/171,072

(22) Filed: Jun. 2, 2016

(65) Prior Publication Data
US 2017/0351594 A1    Dec. 7, 2017

(51) Int. Cl.
  *G06F 9/44*    (2018.01)
  *G06F 11/36*   (2006.01)

(52) U.S. Cl.
  CPC .................................. *G06F 11/362* (2013.01)

(58) Field of Classification Search
  CPC ..................................................... G06F 11/362
  USPC ......................................................... 717/129
  See application file for complete search history.

(56) References Cited

U.S. PATENT DOCUMENTS

| 5,874,958 A * | 2/1999 | Ludolph ................. G06F 9/451 715/781 |
| 6,063,133 A * | 5/2000 | Li .......................... G06F 8/427 714/E11.209 |
| 6,324,683 B1 | 11/2001 | Fuh et al. |
| 7,107,578 B1 | 9/2006 | Alpern |
| 7,155,426 B2 * | 12/2006 | Al-Azzawe .......... G06F 11/3624 |
| 7,162,664 B2 | 1/2007 | Haselden et al. |
| 7,620,911 B2 * | 11/2009 | Webb .................... G06F 3/0481 715/795 |
| 8,443,340 B2 * | 5/2013 | Stairs .................... G06F 11/362 717/100 |
| 8,745,537 B1 * | 6/2014 | Shakeri ................. G06F 11/323 715/734 |
| 8,997,050 B2 * | 3/2015 | Davis ................... G06F 9/45508 717/106 |
| 9,292,413 B2 * | 3/2016 | Faillaci, III .......... G06F 3/0482 |
| 2002/0032675 A1 * | 3/2002 | Williamowski .. G06F 17/30864 |
| 2003/0066053 A1 | 4/2003 | Al-Azzawe |
| 2005/0193264 A1 * | 9/2005 | Khan .................... G06F 11/362 714/38.14 |
| 2007/0168972 A1 | 7/2007 | Bates et al. |

(Continued)

OTHER PUBLICATIONS

IBM: List of IBM Patents or Patent Applications Treated as Related (Appendix P), Aug. 16, 2017, pp. 1-2.

(Continued)

*Primary Examiner* — Evral E Bodden
(74) *Attorney, Agent, or Firm* — Michael A. Petrocelli

(57) ABSTRACT

This disclosure provides a computer-implemented method for debugging a program including a SQL statement. The method comprises indicating one or more first positions of source code of the program. Each of the one or more first positions corresponds to a fragment of the SQL statement at which a breakpoint can be set. The method further comprises receiving an input of setting breakpoint at one of the one or more first positions. The method further comprises presenting an execution context generated in response to execution of the program reaching a breakpoint set based on the input.

20 Claims, 5 Drawing Sheets

(56) References Cited

U.S. PATENT DOCUMENTS

| | | |
|---|---|---|
| 2013/0104107 A1 | 4/2013 | De Smet et al. |
| 2013/0191815 A1 | 7/2013 | Davis et al. |
| 2016/0062870 A1* | 3/2016 | Menahem ............. G06F 11/362 717/125 |
| 2016/0147637 A1* | 5/2016 | Bhagavan ........... G06F 11/3664 717/127 |

OTHER PUBLICATIONS

Pending U.S. Appl. No. 15/662,928, filed Jul. 28, 2017, entitled: "Debugging for SQL Statement", pp. 1-36.

* cited by examiner

DEBUGGING FOR SQL STATEMENT

BACKGROUND

The present invention relates to databases, and more specifically, to a computer-implemented method, a system and a computer program product for debugging a program including a structured query language statement.

A program written in an object oriented programming language such as Java language or a procedural programming language such as C language can be debugged step by step. However, since structured query language (SQL) is known as a descriptive programming language, there are typically a large number of alternative ways to execute a given query, with widely varying performance. When a SQL query (a kind of SQL statement) is submitted to the database, an optimizer evaluates some of the different possible plans for executing the SQL query and returns what it considers the best option. That is, the database management system (DBMS) will choose an execution plan with the lowest cost depending on calculation of the optimizer from among a plurality of possible execution plans.

An execution plan (also referred to as access path) is an ordered set of steps used to access data in a relational database. The access path could be expressed as a tree structure with data processes (such as Index Range Scan, Full Table Scan, and etc.) as its nodes. The data process means a process performed on data, such as sorting, summing, or selecting of data. A leaf node of the tree structure firstly retrieves data from physical data objects and passes the data upwards to its parent node, where the data is further processed before being passed upwards. At the root node, the final result set for the current query is obtained.

BRIEF SUMMARY

Additional aspects and/or advantages will be set forth in part in the description which follows and, in part, will be apparent from the description, or may be learned by practice of the invention.

The inventors of the present invention found that there is a need for debugging a Structured Query Language statement step by step.

To address the need, it is proposed a computer-implemented method, a system and a computer program product for debugging a program including a Structured Query Language statement.

According to one aspect of the present invention, there is provided a computer-implemented method for debugging a program including a SQL statement. The method comprises indicating one or more first positions of source code of the program. Each of the one or more first positions corresponds to a fragment of the SQL statement at which a breakpoint can be set. The method further comprises receiving an input of setting breakpoint at one of the one or more first positions. The method further comprises presenting an execution context generated in response to execution of the program reaching a breakpoint set based on the input.

According to another aspect of the present invention, there is provided a system for debugging a program including a SQL statement. The system comprises one or more processors and a memory coupled to at least one of the one or more processors. The system further comprises a set of computer program instructions stored in the memory and executed by at least one of the one or more processors in order to perform an action of indicating one or more first positions of source code of the program. Each of the one or more first positions corresponds to a fragment of the SQL statement at which a breakpoint can be set. The system further comprises a set of computer program instructions stored in the memory and executed by at least one of the processors in order to perform an action of receiving an input of setting breakpoint at one of the one or more first positions. The system further comprises a set of computer program instructions stored in the memory and executed by at least one of the processors in order to perform an action of presenting an execution context generated in response to execution of the program reaching a breakpoint set based on the input.

According to a further aspect of the present invention, there is provided a computer program product for debugging a program including a SQL statement. The computer program product comprises a computer readable storage medium having program instructions embodied therewith. The program instructions being executable by a device to perform a method. The method comprises indicating one or more first positions of source code of the program. Each of the one or more first positions corresponds to a fragment of the SQL statement at which a breakpoint can be set. The method further comprises receiving an input of setting breakpoint at one of the one or more first positions. The method further comprises presenting an execution context generated in response to execution of the program reaching a breakpoint set based on the input.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
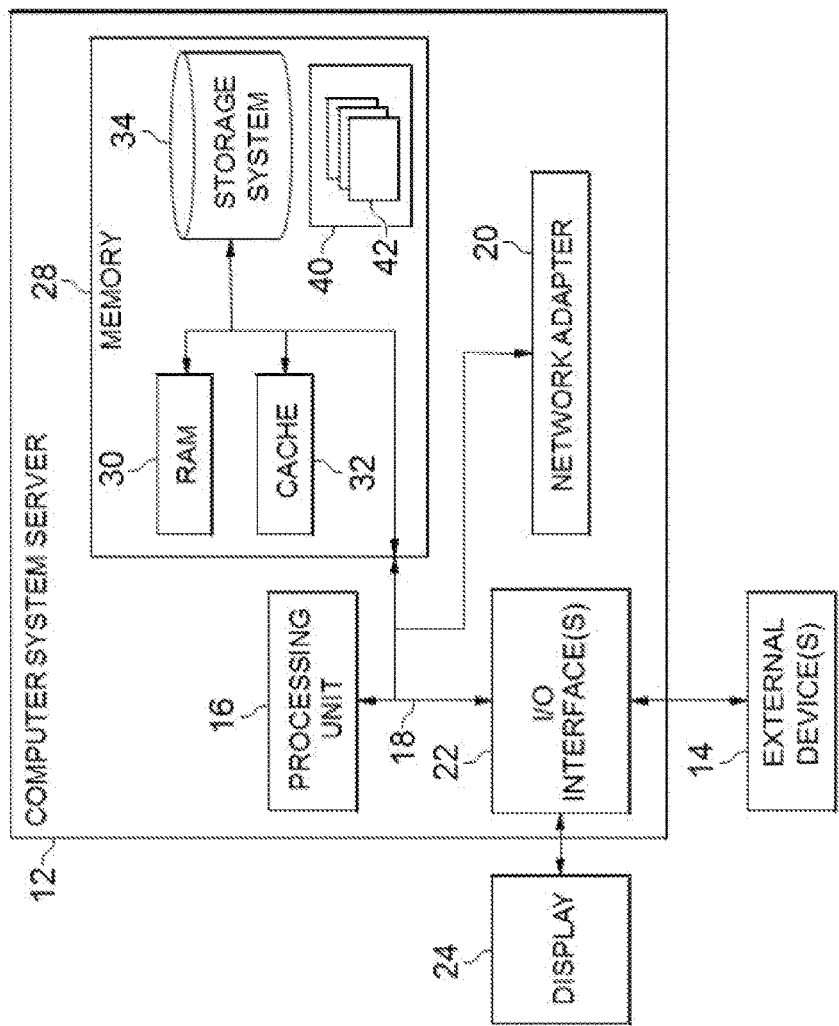
FIG. 1 shows an exemplary computer system which is applicable to implement the embodiments of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be implemented in the computer system/server 12. To better understand the invention, it would be advantageous to introduce the current debugging means for SQL statements.

A program written in procedural language/SQL (PL/SQL) can be considered as being composed of declaration statement, logic control statement and SQL statement. An example program of PL/SQL is shown in Table 1.

TABLE 1

1. Declare emp_salary Number(5,2);
2. Declare emp_bonus Number(5,2);
3. Begin
4. SELECT emp.salary into emp_salary
    FROM emp
    WHERE empno=7499;
5. emp_bonus = emp_salary * 0.5;
6. If emp_bonus > 1000 Then
7. dbms_output.put_line (emp_salary + emp_bonus);
8. Else;
9. End;

In the above program segment, as shown in table 1, the statements in lines 1-2 are declaration statements, the statements in lines 3 and 5-9 are logic control statements, and only the statement in line 4 is a SQL statement. To debug in PL/SQL, a break point can be set in line 5 for example to check the value of variable emp_salary that is the result of the execution of the SQL statement in line 4, or be set in line 6 to check the value of variable emp_bonus. The use of breakpoint is similar to that in C or Java language. However, in PL/SQL a break point cannot be set inside a SQL statement in line 4 for debugging, since a user cannot know how a SQL statement is executed until the execution plan is determined.

Additionally, there is another kind of language named Transect SQL (TSQL), which is similar to PL/SQL. Likewise, in TSQL a break point cannot be set inside a SQL statement for debugging.

The above shows that a SQL query involving many steps of operations cannot be debugged step by step. Thus, it would be very difficult for a programmer to debug a complex SQL statement if there are some errors in it.

Table 2, as shown below, is an example for showing different access paths for a SQL statement.

TABLE 2

CREATE TABLE T1
(C11 DOUBLE
C12 INT
C13 FLOAT
C14 CHAR(10),
C15 VARCHAR(10));
CREATE INDEX IDX_11 ON T1
(C12);

Table 3, as shown below, is an example of SQL query on this table T1 is as follows.

TABLE 3

SELECT *
FROM T1
WHERE T1.C12 = 123;

This SQL query is to retrieve a set of data records from table "T1" whose column "C12" has a value of "123". When receiving this SQL query, an optimizer of the DBMS may choose one from different access paths generated by the DBMS, based on cost or rules.

Figure 2A:
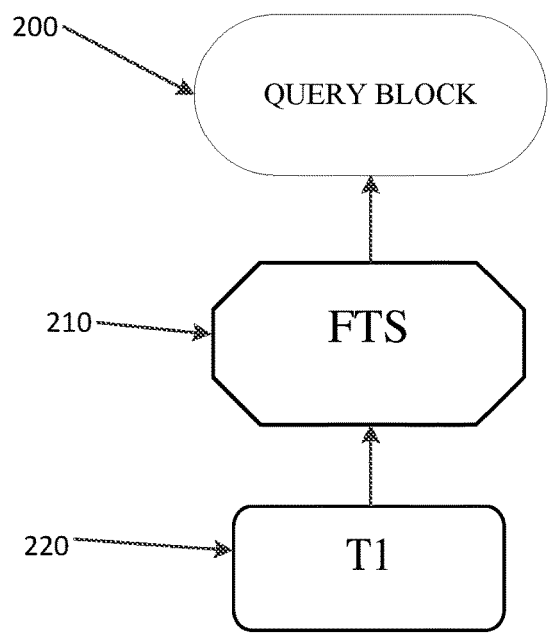
FIGS. 2A and 2B show possible access paths for the same SQL query.
Figure 2B:
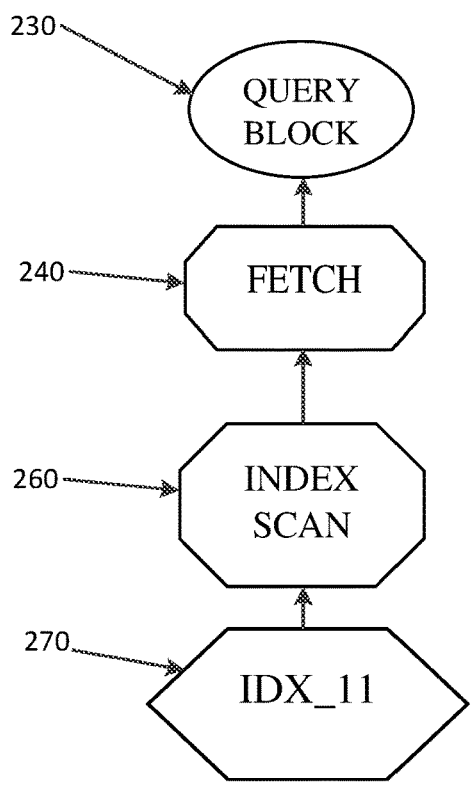

FIGS. 2A and 2B show possible access paths for the same SQL query. In FIGS. 2A and 2B, an oval block 200 and 230 represents a query block, which corresponds to "SELECT" clause, an octagon block 210, 240, and 260 represents a data process such as Full Table Scan, Index Scan, sort and etc, and a rounded rectangle block 220 represents data (e.g., table), and an hexagon block 270 represents index. The above shapes in FIGS. 2A and 2B are only examples to illustrate a graphic representation of an example access path, and the present invention is not thus limited.

In FIG. 2A, a possible access path is shown. In access path 1, firstly, table "T1" 220 is scanned by a process of Full Table Scan (FTS). That is, data of the whole table "T1" 220 is loaded into memory and each data record of table "T1" 220 is checked to find ones whose column "C12" has a value of "123". The retrieved data records are passed from the "FTS" block 210 to its parent node, here the root node "Query Block" 200, at which only columns of these data records that are selected by the keyword "SELECT" are retained. In this case, since all columns are selected (SELECT*), the data records passed from the "FTS" block 210 are directly used as the result set of this query.

In FIG. 2B, another possible access path is shown. In access path 2, firstly, index "IDX_11" 270 created on the column "C12" is scanned by a process of Index Scan 260 to search indexes whose value is 123. The searched indexes are passed from the "Index Scan" 260 block to its parent node, the "FETCH" block 240, at which each passed index is used to locate its corresponding data record by a ROWID for example. The ROWID indicates which data file and data block a data record is located in, and the position of the data record in the data block. Based on the ROWID, the DBMS fetches only the corresponding data records into memory. Then, the fetched data records are passed from the "FETCH" 240 block to its parent node, the root node "Query Block" 230, at which only columns of these data records that are selected by the keyword "SELECT" are retained. In this case, since all columns are selected (SELECT*), the data records passed from the "FETCH" 240 block are directly used as the result set of this query.

Normally, Full Table Scan (for example, as shown by FIG. 2A) is suitable for retrieving in a table with a small number of data records or suitable for a case where the data records to be retrieved account for a remarkable ratio of the table; and Index Scan (for example, as shown by FIG. 2B) is suitable for retrieving in a table with a large number of data records or suitable for a case where the data records to be retrieved account for a small ratio of the table. The selection of an access path is performed by the DBMS based on cost or rules automatically, and usually does not need the intervening of a programmer.

Figure 3:
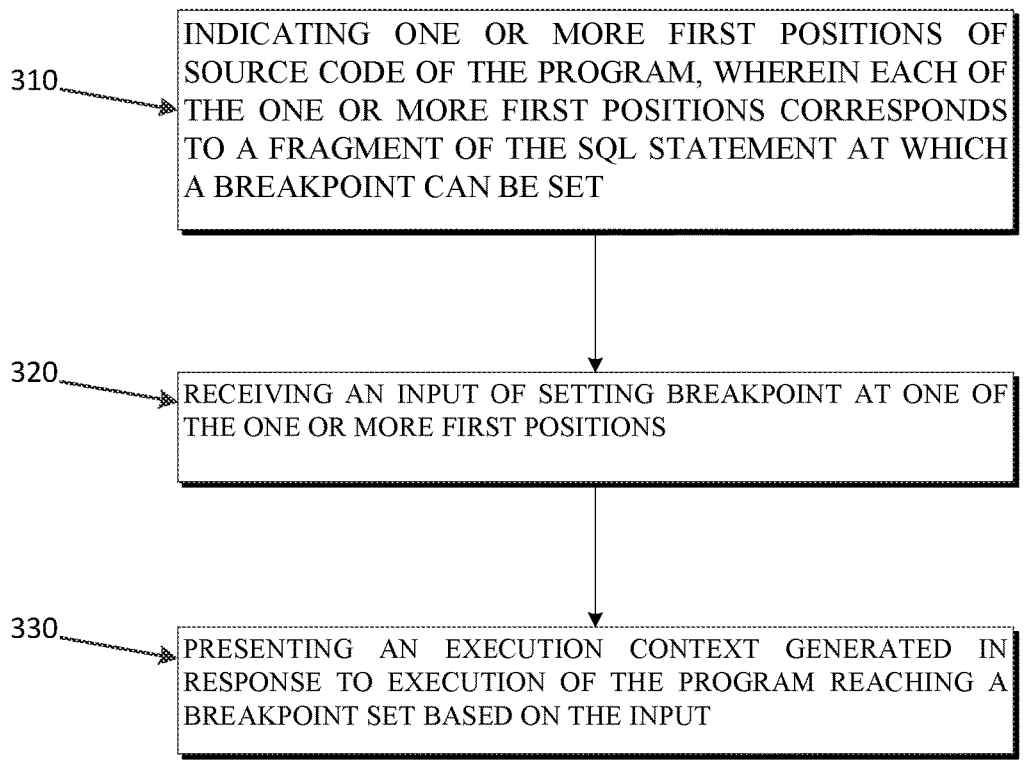
FIG. 3 is a flowchart illustrating a computer-implemented method for debugging a program including a SQL statement according to an embodiment of the present invention.

FIG. 3 is a flowchart illustrating a computer-implemented method for debugging a program including a SQL statement according to an embodiment of the present invention. As shown in FIG. 3, the computer-implemented method for debugging a program including a SQL statement includes a position indication step 310, a breakpoint setting reception step 320, and an execution context presenting step 330. Hereinafter, respective steps of the method for debugging a program including a SQL statement in the FIG. 3 will be explained in detail.

When a program is to be debugged, an integrated development environment (IDE) such as Eclipse will be used, which provides a function of setting breakpoints in the program to facilitate locating of errors in the source code of the program. In one embodiment of the invention, in response to a program including a SQL statement being debugged, that is, entering a debug mode, the method in FIG. 3 starts.

In one embodiment of the invention, the program may be a program written in PL/SQL or other languages that can include a SQL statement. In another embodiment of the invention, the program may include only a SQL statement per se, and do not include other statements such as declaration statements and logic control statements. That is, in the latter case, the program may include a single SQL query.

In the position indication step 310, one or more first positions of source code of the program are indicated to a user, wherein a breakpoint can be set at each of the first positions which corresponds to a fragment of the SQL statement. The fragment of the SQL statement refers to a part of the SQL statement, such as a clause, an equation or a variable in the SQL statement. The first position indicates a position in the source code on the user interface (UI) at which a breakpoint can be set, which corresponds to a fragment of a SQL statement instead of a whole SQL statement. The following SQL query, as shown by table 4, table 5, and table 6 are taken as an example to explain the method in FIG. 3.

TABLE 4

SELECT Persons.LastName, Persons.FirstName, Orders.OrderNo
FROM Persons, Orders
WHERE Persons.Id_P = Orders.Id_P

TABLE 5

| Id_P | LastName | FirstName | Level |
|------|----------|-----------|--------|
| 1 | Adams | John | High |
| 2 | Bush | George | Middle |
| 3 | Carter | Thomas | Low |

TABLE 6

| Id_O | OrderNo | Id_P |
|---|---|---|
| 1 | 77895 | 3 |
| 2 | 44678 | 3 |
| 3 | 22456 | 1 |
| 4 | 24562 | 1 |
| 5 | 34764 | 65 |

In the table 5, the primary key is Id_P, and in the table 5, the primary key is Id_O. The above SQL query is to find who has placed orders and which orders he/she placed. With the above example, let us refer back to the position indication step 310 of the method in FIG. 3. In this embodiment, for example, fragments such as "Persons.Id_P", "Orders.Id_P" and "Persons.Id_P=Orders.Id_P" in the SQL query will be indicated to the user so that the user knows breakpoints can be set on these fragments. Hereinafter, the position of a fragment at which a breakpoint may be set is referred to as a first position.

The first positions may be indicated to the user in many ways. In one embodiment of the invention, a fragment of the SQL statement at which a breakpoint can be set will be displayed with a different font color or a different background color. In another embodiment of the invention, when a cursor moves over a fragment at which a breakpoint can be set, a hint such as a bubble or window will pop up to prompt the user that a breakpoint can be set here. These are only examples for illustrating the ways of indication. Other ways of indication are also possible as long as the user can be informed that which fragments can be set with breakpoints.

In one embodiment of the invention, each of the one or more first positions of source code of the program has a correspondence with a part in an access path generated by a database management system of a database based on the SQL statement. As described above, when a SQL statement is input, the DBMS parses the SQL statement to generate one or more possible access paths and will select one, for example with an optimizer, based on cost consideration or predetermined rules. So the DBMS knows how to map fragments of a SQL statement to elements in an access path. For example, "INNER JOIN" corresponds to a process of "join" in the access path, and "ORDER BY" clause corresponds to a process of "sort" in the access path.

Figure 4:
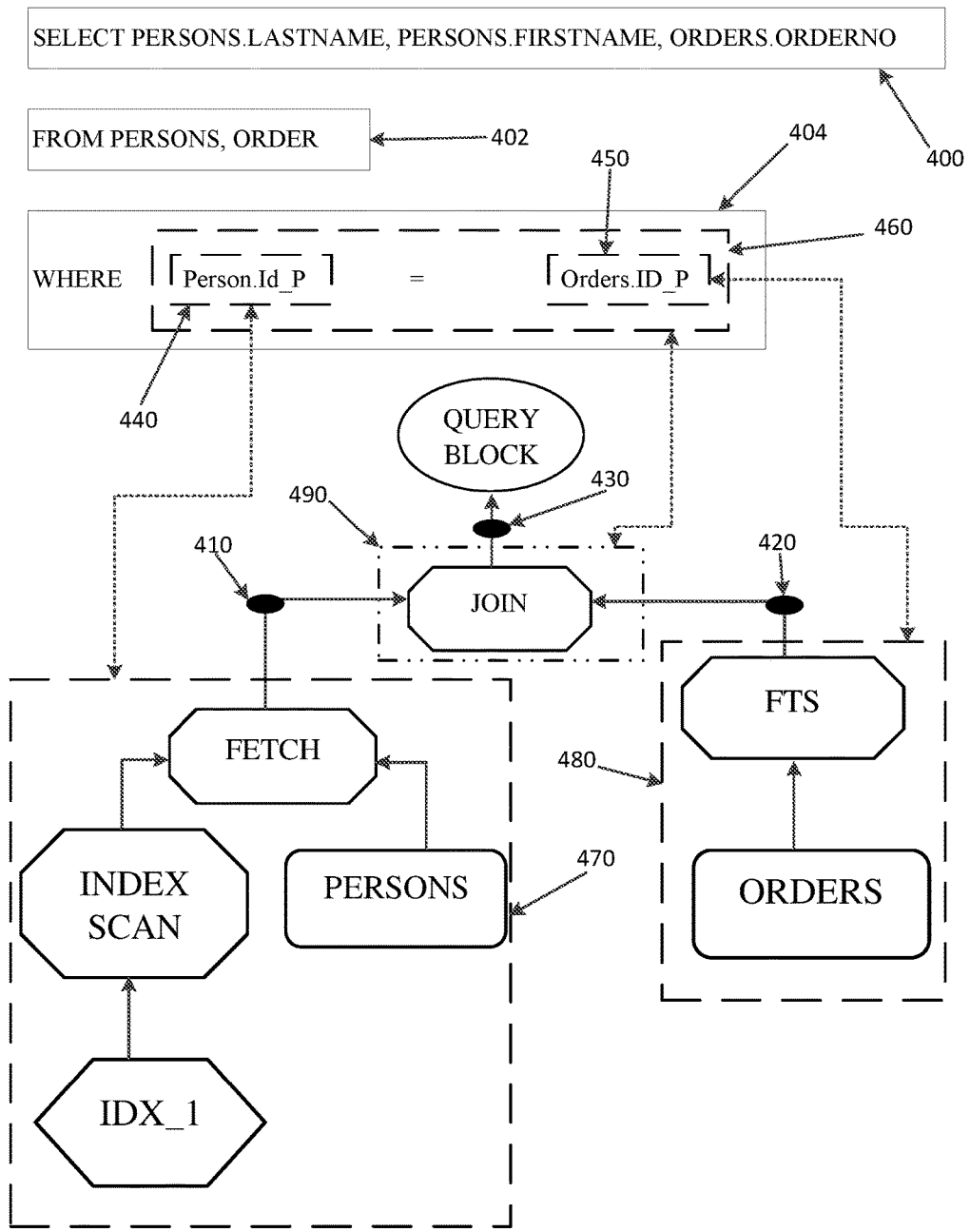
FIG. 4 shows an exemplary SQL query and its correspondence with its access path according to an embodiment of the present invention.

FIG. 4 shows an exemplary SQL query and its correspondence with its access path according to an embodiment of the present invention. In FIG. 4, the above SQL query 400 is taken as an example again to explain the correspondence between a SQL statement and its access path 402. In FIG. 4, column "Persons.Id_P" appears in the "WHERE" clause 404, which means data records in the table "Persons" needs to be retrieved. On the other hand, in the access path 402, table "Persons" is retrieved in the left branch 470 in the access path with "FETCH" octagon block as the top node. Therefore, "Persons.Id_P" in the source code (surrounded by broken lines and indicated by 440) has a correspondence with the left branch 470 (surrounded by broken lines) on the left side in the access path with a "FETCH" octagon block as the top node, and this correspondence is shown by the bidirectional arrow broken line between 440 and 470. In the left branch 470, specifically, the table "Persons" is retrieved by a process of Index Scan based on an index "IDX_1" created on the column "Persons.Id_P".

Similarly, "Orders.Id_P" in the source code (surrounded by broken lines and indicated by 450) has a correspondence with the right branch 480 (surrounded by broken lines) on the right side in the access path with a "FTS" octagon block as the top node, and this correspondence is shown by the bidirectional arrow broken line between 450 and 480. In the right branch 480, specifically, the table "Orders" is retrieved by a process of FTS (Full Table Scan).

Additionally, it is known that, the fragment "Persons.Id_P=Orders.Id_P" (surrounded by broken lines as a whole and indicated by 460) implicitly involves a join operation, so it has a correspondence with a join process, that is, it has a correspondence with the "JOIN" block 490 in the access path, and this correspondence is shown by the bidirectional arrow broken line between 460 and 490.

Since the correspondence between fragments of a SQL statement and elements in its access path is known to the DBMS, it can be saved by the DBMS in generating the access path for later use. In one embodiment of the invention, only the first positions are indicated to the user in a debug mode. In another embodiment of the invention, both of the first positions and the correspondence are shown to the user. In one example, the representation of the access path may be a graphic representation such as the one in FIG. 4. In other examples, the access path may be displayed to the user in textual or tabular forms. The representation of the access path is not limited, and it is sufficient as long as it can represent a tree structure.

Now referring back to FIG. 3, in the breakpoint setting reception step 320, an input of setting breakpoint at one of the first positions is received from the user. For example, the input may be a click on one of the first positions. In response to the click, a breakpoint is set at the first position that corresponds to a fragment of a SQL statement. The user can set more than one breakpoint. Taking the scenario in FIG. 4 as an example, a breakpoint can be set on any one of positions 440, 450 and 460.

In one embodiment of the invention, the method in FIG. 3 further comprises: setting the breakpoint at the one of the one or more first positions based on the input; and equipping a probe capable of acquiring the execution context for the breakpoint at an exit of the part in the access path that corresponds to the one of the one or more first positions. The execution context includes at least one of retrieved data records, referenced table information and real time statistics. Taking the scenario in FIG. 4 as an example, if a breakpoint is set at position 440 in the source code, a probe will be equipped at the point 410 in the access path, which is the output of branch 470. Similarly, if a breakpoint is set at position 450 in the source code, a probe will be equipped at the point 420 in the access path, which is the output of branch 480; and if a breakpoint is set at position 460 in the source code, a probe will be equipped at the point 430 in the access path, which is the output of block 490. As is commonly known to those skilled in the art, a probe is a code segment that can be inserted into a program to provide information about the program as it runs. In one embodiment of the invention, probes are inserted in the DBMS to intercept such information as data records that are retrieved, information on which table is referenced, and/or real time statistics. For example, on a well-known Eclipse™ platform, Probekit™ is provided to facilitate the writing and using of probes.

Now referring back to FIG. 3, in the execution context presenting step 330, an execution context generated in response to the program executing to the breakpoint set based on the input is presented to the user. The execution context is generated when the program executes to the breakpoint in response to starting execution of the program.

Taking the scenario in FIG. 4 as an example, if a breakpoint is set at the position 440 in the source code, the probe equipped at the point 410 in the access path will intercept the intermediate result output by the branch 470. Here, in this example, the intermediate result (retrieved data records) is the whole table "Persons". That is, all of the data records in the table "Persons" are retrieved in the "FETCH" block and intercepted by the probe equipped at the point 410 before they are passed to the "JOIN" block. If a breakpoint is set at the position 450 in the source code, the probe equipped at the point 420 in the access path will intercept the intermediate result output by the branch 480. Here, in this example, the intermediate result (retrieved data records) is the whole table "Orders". That is, all of the data records in the table "Orders" are retrieved in the "FTS" block and intercepted by the probe equipped at the point 420 before they are passed to the "JOIN" block. If a breakpoint is set at the position 460 in the source code, the probe equipped at the point 430 in the access path will intercept the intermediate result output by the "JOIN" point 430. Here, in this example, the intermediate result (retrieved data records) intercepted by probe equipped at the point 430 is as shown in the following Table 7.

TABLE 7

| Id_O | OrderNo | Id_P | LastName | FirstName | Level |
|------|---------|------|----------|-----------|-------|
| 1 | 77895 | 3 | Carter | Thomas | Low |
| 2 | 44678 | 3 | Carter | Thomas | Low |
| 3 | 22456 | 1 | Adams | John | High |
| 4 | 24562 | 1 | Adams | John | High |

After the final column selection in "Query Block" in FIG. 4, the result set of this SQL query is shown as in the following Table 8.

TABLE 8

| LastName | FirstName | OrderNo |
|----------|-----------|---------|
| Carter | Thomas | 77895 |
| Carter | Thomas | 44678 |
| Adams | John | 22456 |
| Adams | John | 24562 |

According to embodiments of the present invention, the execution context including retrieved data records such as those in Table 7 will be presented to the user so that the user can debug the SQL statement using these intermediate results or information. In one embodiment of the invention, the execution context can be displayed in a separate window from the window displaying the source code. In another embodiment of the invention, the execution context can be displayed in a bubble or window that pops up when a cursor moves over a set breakpoint in the source code.

The present invention is not limited only to set a breakpoint at a fragment of a SQL statement. In one embodiment of the invention, one or more second positions of source code of the program is also indicated to the user, and a breakpoint can be set at each of the second positions which corresponds to one of a SQL statement, a declaration statement and a logic control statement. Thus the present invention is compatible with current debug tools and also supports setting breakpoints for a whole SQL statement or other statements such as a declaration statement and a logic control statement. Breakpoints set at the first positions (inventive ones) and breakpoints set at the second positions (conventional ones) can be displayed in the same manner or in a different manner.

In one embodiment of the invention, the execution context acquired for the breakpoint in an execution of the program can be saved for generating data records for the breakpoint in a later execution of the program, which are retrieved from the database otherwise. We will provide another example to explain the details thereof.

Figure 5:
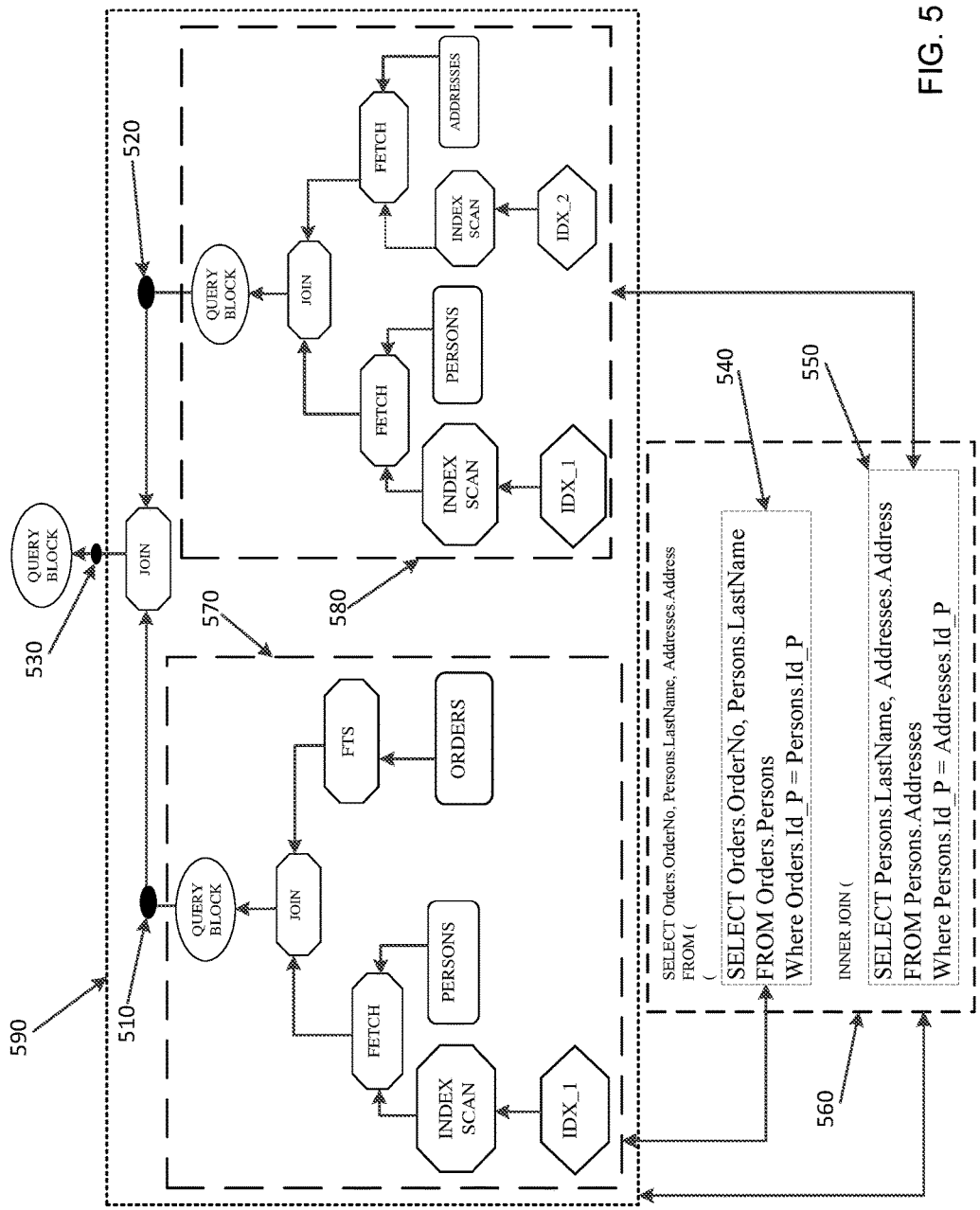
FIG. 5 shows a more complex exemplary SQL query and its correspondence with its access path according to an embodiment of the present invention.

FIG. 5 shows a more complex exemplary SQL query and its correspondence with its access path according to an embodiment of the present invention. A new table 9 "Addresses" is introduced to the above example, which is shown as below. The exemplary SQL query is shown after the table 9.

TABLE 9

| Id_P | Address | City |
|------|---------|------|
| 1 | Oxford Street | London |
| 2 | Fifth Avenue | New York |
| 3 | Changan Street | Beijing |

TABLE 10

SELECT Orders.OrderNo, Persons.LastName, Addresses.Address
FROM (
(
SELECT Orders.OrderNo, Persons.LastName
FROM Orders, Persons
WHERE Orders.Id_P = Persons.Id_P
)
INNER JOIN
(
SELECT Persons.LastName, Addresses.Address
FROM Persons, Addresses
WHERE Persons.Id_P = Addresses.Id_P
) )

In the table "Addresses", the primary key is Id_P. This SQL query is to find buyer name and his/her delivery address of each order. This SQL query involves two sub-queries, table 10 (540, 550). The first sub-query (fragment 540) is used to join the table "Persons" and the table "Orders", and the second sub-query (fragment 550) is used to join the table "Persons" and the table "Addresses". Thus, the three tables are joined through the column "Id_P". Similar to the example in FIG. 4, in FIG. 5, fragment 540 of the SQL statement corresponds to part 570 of the access path, fragment 550 of the SQL statement corresponds to part 580 of the access path, fragment 560 of the SQL statement corresponds to part 590 of the access path. Therefore, in FIG. 5, a breakpoint can be set at each of positions (fragments) 540, 550 and 560. If a breakpoint is set at position 540 in the source code, a probe will be equipped at point 510 in the access path, which is the output of branch 570; if a breakpoint is set at position 550 in the source code, a probe will be equipped at point 520 in the access path, which is the output of branch 580; and if a breakpoint is set at position 560 in the source code, a probe will be equipped at point 530 in the access path, which is the output of part 590. Probes are inserted in the DBMS to intercept information such as retrieved data records, referenced table information or real time statistics. It should be note that, a coarse granularity is used in FIG. 5 as an example to explain the invention, and a sub-query is deemed as a fragment of the SQL statement at which a breakpoint can be set. However, in the FIG. 5, a finer granularity can be used in which a breakpoint can be set at a fragment of a sub-query such as the ones illustrated in FIG. 4. Here, for the clarity of explanation, FIG. 5 does not particularly show the fragments in the finer granularity.

For simplicity, we only explain the scenario if a breakpoint is set at fragment 550. In this case, the probe equipped at point 520 will intercept the following intermediate result.

TABLE 11

| LastName | Address |
|---|---|
| Adams | Oxford Street |
| Bush | Fifth Avenue |
| Carter | Changan Street |

In an embodiment of the invention, the acquired execution context such as data records in Table 11 that corresponds to the retrieved result of the branch 580 in the access path can be saved after the first execution of the SQL query. When the SQL query is executed again, instead of executing the branch 580 again by retrieving from the database, the saved execution context is directly provided to the upper "JOIN" block as the output of the branch 580. By doing so, debugging time of the programmer will be saved if a sub-query or a fragment of the SQL statement involves a time-consuming database operation.

In an embodiment of the invention, in saving the execution context, data records retrieved from the database for the breakpoint are partly saved by data sampling as a part of the execution context. In another embodiment of the invention, only a part of the data records in an execution context saved for a breakpoint are used to generate data records for the breakpoint in a later execution of the program. The two embodiments can be combined. Since sometimes instead of the integrity of the result set, it is the SQL statement's logic that is to be verified in debugging, we can only save a part of data records retrieved at a breakpoint in the execution context. Data sampling by row, page, or block may be used to do so. In another embodiment of the invention, even if the whole execution context is saved, in a later execution of the program, only a part of the data records in the execution context are passed to an upper block to generate the final result set. All of these options may be set by the user.

It is to be noted that, although SQL queries are explained above as examples, the embodiments of the invention apply to other SQL statements such as an UPDATE statement as long as they can be parsed into access paths.

The present invention may be a system, a method, and/or a computer program product. The computer program product may include a computer readable storage medium (or media) having computer readable program instructions thereon for causing a processor to carry out aspects of the present invention.

In an embodiment of the present invention, there is provided a system for debugging a program including a SQL statement. The system comprises one or more processors and a memory coupled to at least one of the one or more processors. The system further comprises a set of computer program instructions stored in the memory and executed by at least one of the one or more processors in order to perform an action of indicating one or more first positions of source code of the program. Each of the one or more first positions corresponds to a fragment of the SQL statement at which a breakpoint can be set. The system further comprises a set of computer program instructions stored in the memory and executed by at least one of the processors in order to perform an action of receiving an input of setting breakpoint at one of the one or more first positions. The system further comprises a set of computer program instructions stored in the memory and executed by at least one of the processors in order to perform an action of presenting an execution context generated in response to execution of the program reaching a breakpoint set based on the input.

In one embodiment of the system, the system may further comprise a set of computer program instructions stored in the memory and executed by at least one of the processors in order to perform an action of indicating one or more second positions of source code of the program, wherein each of the one or more second positions corresponds to one of a SQL statement, a declaration statement and a logic control statement at which a breakpoint can be set.

In one embodiment of the system, each of the one or more first positions of source code of the program has a correspondence with a part in an access path generated by a database management system of a database based on the SQL statement.

In one embodiment of the system, the system may further comprise a set of computer program instructions stored in the memory and executed by at least one of the processors in order to perform an action of displaying the correspondence of each of the one or more first positions of source code of the program.

In one embodiment of the system, the system may further comprise a set of computer program instructions stored in the memory and executed by at least one of the processors in order to perform an actions of setting the breakpoint at the one of the one or more first positions based on the input; and equipping a probe capable of acquiring the execution context for the breakpoint at an exit of the part in the access path that corresponds to the one of the one or more first positions.

In one embodiment of the system, the execution context includes at least one of retrieved data records, referenced table information and real time statistics.

In one embodiment of the system, the execution context acquired for the breakpoint in an execution of the program is saved for generating data records for the breakpoint in a later execution of the program.

In one embodiment of the system, in saving the execution context, data records retrieved from the database for the breakpoint are partly saved by data sampling as a part of the execution context.

In one embodiment of the system, only a part of the data records in an execution context saved for a breakpoint are used to generate data records for the breakpoint in a later execution of the program.

In an embodiment of the present invention, there is provided a computer program product for debugging a program including a SQL statement. The computer program product comprises a computer readable storage medium having program instructions embodied therewith. The program instructions being executable by a device to perform a method. The method comprises indicating one or more first positions of source code of the program. Each of the one or more first positions corresponds to a fragment of the SQL statement at which a breakpoint can be set. The method further comprises receiving an input of setting breakpoint at one of the one or more first positions. The method further comprises presenting an execution context generated in response to execution of the program reaching a breakpoint set based on the input.

In one embodiment of the computer program product, the method may further comprise indicating one or more second positions of source code of the program, wherein each of the one or more second positions corresponds to one of a SQL statement, a declaration statement and a logic control statement at which a breakpoint can be set.

In one embodiment of the computer program product, each of the one or more first positions of source code of the program has a correspondence with a part in an access path generated by a database management system of a database based on the SQL statement.

In one embodiment of the computer program product, the method may further comprise displaying the correspondence of each of the one or more first positions of source code of the program.

In one embodiment of the computer program product, the method may further comprise setting the breakpoint at the one of the one or more first positions based on the input; and equipping a probe capable of acquiring the execution context for the breakpoint at an exit of the part in the access path that corresponds to the one of the one or more first positions.

In one embodiment of the computer program product, the execution context includes at least one of retrieved data records, referenced table information and real time statistics.

In one embodiment of the computer program product, the execution context acquired for the breakpoint in an execution of the program is saved for generating data records for the breakpoint in a later execution of the program.

In one embodiment of the computer program product, in saving the execution context data records retrieved from the database for the breakpoint are partly saved by data sampling as a part of the execution context.

In one embodiment of the computer program product, only a part of the data records in an execution context saved for a breakpoint are used to generate data records for the breakpoint in a later execution of the program.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A computer-implemented method for debugging a program including a Structured Query Language (SQL) statement, the method comprising:
    indicating one or more first positions of a source code of a program, wherein each of the one or more first positions corresponds to a fragment of a SQL statement at which a breakpoint can be set, and a sub-query is considered a fragment, wherein when a user moves a cursor over a fragment at which the breakpoint can be set, the movement of the cursor over the fragment will cause a bubble or a window to open to prompt the user that a break point can be set, wherein the fragment of the SQL statement refers to a part of the SQL statement, such as including a clause, an equation or a variable in the SQL statement;
    receiving an input of the setting breakpoint at one of the one or more first positions; and
    presenting an execution context generated in response to execution of the program reaching the breakpoint set based on the input.

2. The computer-implemented method according to claim 1, wherein each of the one or more first positions of the source code of the program has a correspondence with a part in an access path generated by a database management system of a database based on the SQL statement, and each of the one or more positions of the source code corresponds to one or more fragments of a sub-query at which a breakpoint can be set.

3. The method according to claim 2, further comprising:
    displaying the correspondence of each of the one or more first positions of source code of the program.

4. The computer-implemented method according to claim 2, further comprising:
    setting the breakpoint at the one of the one or more first positions based on the input; and
    equipping a probe to acquire the execution context for the breakpoint at an exit of the part in the access path that corresponds to the one of the one or more first positions.

5. The computer-implemented method according to claim 2, wherein the execution context includes at least one of retrieved data records, referenced table information and real time statistics.

6. The computer-implemented method according to claim 5, wherein the execution context acquired for the breakpoint in an execution of the program is saved for generating data records for the breakpoint in a later execution of the program.

7. The computer-implemented method according to claim 6, wherein in saving the execution context, data records retrieved from the database for the breakpoint are partly saved by data sampling as a part of the execution context.

8. The computer-implemented method according to claim 6, wherein only a part of the data records in an execution context saved for a breakpoint are used to generate data records for the breakpoint in a later execution of the program.

9. The computer-implemented method according to claim 1, further comprises:
    indicating one or more second positions of source code of the program, wherein each of the one or more second positions corresponds to at least one of a SQL statement, a declaration statement, or a logic control statement at which a breakpoint can be set.

10. A system for debugging a program including a Structured Query Language (SQL) statement, comprising:
    one or more processors;
    a memory coupled to at least one of the one or more processors;
    a set of computer program instructions stored in the memory and executed by at least one of the one or more processors in order to perform actions of:
    indicating one or more first positions of source code of a program, wherein each of the one or more first positions corresponds to a fragment of the SQL statement at which a breakpoint can be set, and a sub-query is considered a fragment, wherein when a user moves a cursor over a fragment at which the breakpoint can be set, the movement of the cursor over the fragment will cause a bubble or a window to open to prompt the user that a break point can be set, wherein the fragment of the SQL statement refers to a part of the SQL statement, including a clause, an equation or a variable in the SQL statement;
    receiving an input of setting breakpoint at one of the one or more first positions; and
    presenting an execution context generated in response to execution of the program reaching a breakpoint set based on the input.

11. The system according to claim 10, wherein each of the one or more first positions of source code of the program has a correspondence with a part in an access path generated by a database management system of a database based on the SQL statement, and each of the one or more positions of the source code corresponds to one or more fragments of a sub-query at which a breakpoint can be set.

12. The system according to claim 11, further comprising a set of computer program instructions stored in the memory and executed by at least one of the one or more processors in order to perform actions of:

setting the breakpoint at the one of the one or more first positions based on the input; and equipping a probe capable of acquiring the execution context for the breakpoint at an exit of the part in the access path that corresponds to the one of the one or more first positions.

13. The system according to claim 11, wherein the execution context includes at least one of retrieved data records, referenced table information and real time statistics.

14. The system according to claim 13, wherein the execution context acquired for a breakpoint in an execution of the program is saved for generating data records for the breakpoint in a later execution of the program.

15. The system according to claim 14, wherein in saving the execution context, data records retrieved from the database for the breakpoint are partly saved by data sampling as a part of the execution context.

16. The system according to claim 14, wherein only a part of the data records in an execution context saved for the breakpoint are used to generate data records for the breakpoint in a later execution of the program.

17. A computer program product for debugging a program including a SQL statement, the computer program product comprising a computer readable storage medium having program instructions embodied therewith, wherein the program instructions being executable by a device to perform a method comprising:

indicating one or more first positions of source code of the program, wherein each of the one or more first positions corresponds to a fragment of the SQL statement at which a breakpoint can be set, and a sub-query is considered a fragment, wherein when a user moves a cursor over a fragment at which the breakpoint can be set, the movement of the cursor over the fragment will cause a bubble or a window to open to prompt the user that a break point can be set, wherein the fragment of the SQL statement refers to a part of the SQL statement, including a clause, an equation or a variable in the SQL statement;

receiving an input of setting breakpoint at one of the one or more first positions; and presenting an execution context generated in response to execution of the program reaching a breakpoint set based on the input.

18. The computer program product according to claim 17, wherein each of the one or more first positions of source code of the program has a correspondence with a part in an access path generated by a database management system of a database based on the SQL statement, and each of the one or more positions of the source code corresponds to one or more fragments of a sub-query at which a breakpoint can be set.

19. The computer program product according to claim 18, wherein the method further comprising:

setting the breakpoint at the one of the one or more first positions based on the input; and equipping a probe capable of acquiring the execution context for the breakpoint at an exit of the part in the access path that corresponds to the one of the one or more first positions.

20. The computer program product according to claim 18, wherein the execution context includes at least one of retrieved data records, referenced table information and real time statistics.

* * * * *